United States Patent
Rinne et al.

(10) Patent No.: US 7,899,463 B2
(45) Date of Patent: Mar. 1, 2011

(54) COMMUNICATION RESOURCE CONTROL ENHANCING TIME-BASED FREQUENCY REUSE

(75) Inventors: Mikko J. Rinne, Espoo (FI); Sami Savio, Tampere (FI); Kodo Shu, Miyamae-ku (JP)

(73) Assignee: Nokia Corporation, Espoo (FI)

( * ) Notice: Subject to any disclaimer, the term of this patent is extended or adjusted under 35 U.S.C. 154(b) by 368 days.

(21) Appl. No.: 11/150,146

(22) Filed: Jun. 13, 2005

(65) Prior Publication Data
US 2006/0182067 A1 Aug. 17, 2006

(30) Foreign Application Priority Data
Feb. 16, 2005 (EP) ................................. 05003321

(51) Int. Cl.
- H04W 72/00 (2009.01)
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ..................... 455/453; 455/452.1; 370/229

(58) Field of Classification Search ................. 370/229, 370/310, 463; 455/452.1, 453, 464
See application file for complete search history.

(56) References Cited

U.S. PATENT DOCUMENTS

| | | | |
|---|---|---|---|
| 5,912,884 A * | 6/1999 | Park et al. | 370/331 |
| 6,266,531 B1 * | 7/2001 | Zadeh et al. | 455/453 |
| 6,690,939 B1 * | 2/2004 | Jonsson et al. | 455/453 |
| 7,099,674 B2 * | 8/2006 | Diao et al. | 455/453 |
| 7,321,772 B2 * | 1/2008 | Morimoto et al. | 455/453 |
| 2001/0030956 A1 * | 10/2001 | Chillariga et al. | 370/348 |
| 2002/0052206 A1 * | 5/2002 | Longoni | 455/453 |

(Continued)

FOREIGN PATENT DOCUMENTS

WO  9844754 A2  10/1998

(Continued)

OTHER PUBLICATIONS

European Search Report, Application No. EP 06100206, Date of Completion: Jan. 14, 2010, Date of Mailing: Jan. 25, 2010, pp. 1-9.

*Primary Examiner*—Andrew Wendell
(74) *Attorney, Agent, or Firm*—Squire, Sanders & Dempsey (US) LLP (57) ABSTRACT

A method performs communication resource control in at least one cell of a cellular communication network. The cell includes a base station communicating using at least one frequency and the cell is operated according to a time-based frequency reuse technique. A communication between a terminal and the base station is based on a time frame structure including a plurality of time slots. The method includes the step of obtaining, at the base station of the cell, loading conditions of at least one cell among the subject cell and its neighboring cells. The method also includes the step of adapting, at the base station of the cell, at least one parameter of communication resource control of the base station on the basis of the loading conditions obtained. A base station, a terminal, a system, and a computer program product to implement the method.

41 Claims, 6 Drawing Sheets

U.S. PATENT DOCUMENTS

| | | | |
|---|---|---|---|
| 2002/0077113 A1* | 6/2002 | Spaling et al. | 455/453 |
| 2002/0142773 A1* | 10/2002 | Rudrapatna et al. | 455/440 |
| 2003/0017837 A1* | 1/2003 | Kalliojarvi | 455/522 |
| 2003/0078048 A1* | 4/2003 | Henriksson | 455/446 |
| 2003/0153315 A1* | 8/2003 | Gunreben et al. | 455/445 |
| 2003/0202490 A1 | 10/2003 | Gunnarsson et al. | |
| 2004/0053630 A1* | 3/2004 | Ramos et al. | 455/500 |
| 2004/0132460 A1* | 7/2004 | Lee | 455/453 |
| 2004/0166835 A1 | 8/2004 | Johansson et al. | |
| 2004/0209624 A1* | 10/2004 | Rune et al. | 455/453 |
| 2005/0215265 A1* | 9/2005 | Sharma | 455/453 |
| 2005/0227701 A1* | 10/2005 | Khawand | 455/453 |
| 2006/0128394 A1* | 6/2006 | Turina et al. | 455/453 |

FOREIGN PATENT DOCUMENTS

| | | |
|---|---|---|
| WO | 0010296 A2 | 2/2000 |
| WO | 0055976 A2 | 9/2000 |
| WO | 0249306 A2 | 6/2002 |

* cited by examiner

COMMUNICATION RESOURCE CONTROL ENHANCING TIME-BASED FREQUENCY REUSE

CROSS REFERENCE TO RELATED APPLICATION

The invention herein claims priority to European Patent Application No. 05003321.6, filed Feb. 16, 2005, under 35 U.S.C. §119(e), the substance of which is incorporated herein by reference in full.

FIELD OF THE INVENTION

The present invention relates to a method, functional elements, a system, and a computer program product for communication resource control in a cell of a cellular communication network. In particular, the present invention relates to an enhancement of a scheme for a time-based frequency reuse to loading conditions in neighboring cells of e.g. a 4G mobile communication network.

BACKGROUND OF THE INVENTION

Mobile communication systems have been developed with the aim to facilitate communication everywhere, with everyone and at any time. In recent years, mobile communication systems, and particularly cellular communication systems, experienced a huge increase, both in the number of users and in the quality and demands of services offered.

Commonly used and widely spread mobile communication systems such as the pan-European Global System for Mobile Communication (GSM) are cellular systems. A cellular system or network is characterized in that it is organized on a cell basis, wherein each cell comprises a base station whose radio coverage area defines the geographical spreading of this cell. Since only a limited frequency band is available for an entire mobile communication network and each communication channel requires a certain bandwidth, it is essential to exploit the available frequency band as efficient as possible such that as many users as possible can be serviced in the network. Therefore, in a cellular network, the available frequencies are usually reused on a cell basis. This means that the same set of frequencies, i.e. the same frequency band, which is used in one cell are also used in another cell of the same system in order to increase the user capacity of the system. However, in this regard, there exists a drawback in that interferences between the communications of users in different cells may occur, when the same frequencies are used. Such interferences are desired to be avoided since the communication quality is deteriorated due to them. Thus, the same frequencies are to be reused only in cells which are spaced at a minimum distance from each other. However, the larger the spatial frequency reuse is and, thus, the lower potential interferences are, the fewer users can be serviced in the system, i.e. the lower the capacity of the system is. That is the spatial frequency reuse is desired to be as small as possible, in particular in view of an increasing number of users.

In order to cope with the increasing requirements mentioned above in terms of number of users and demands of services, which are posed on mobile communications, mobile systems and networks of the third generation (3G) and even the fourth generation (4G) are under development and partly already in operation, e.g. the General Packet Radio Service (GPRS) and the Universal Mobile Telecommunication System (UMTS). Some of these systems are based on code division multiple access (CDMA) techniques.

The current working assumption for a 4G cellular system in a high frequency bandwidth requirement amounts to 1 Gbps (Gigabits per second) in maximum data rate. To achieve reasonable multi-operator scenarios in view of suchlike requirements and with limited total bandwidth availability, the frequency reuse factor in the network must be low. Further, for a continuous coverage of the whole cell by its base station, pilot and broadcast channels must be receivable over the whole cell area, which may also result in overlaps with neighboring cells. However, such overlaps are adverse with respect to the aim of a smaller frequency reuse factor, since overlaps between cells using the same frequency bands would again result in deteriorating interferences.

Generally, an overlapping can be avoided or, at least, reduced by accordingly affecting the transmission powers of cells using the same frequency band. A method for channel allocation utilizing power restrictions is presented in U.S. Pat. No. 6,259,685. In this method the time-slotted transmissions of synchronized base stations are arranged in such a way that transmissions utilizing maximum power P do not occur at the same time t in cells sharing the same frequency band.

Figure 1:
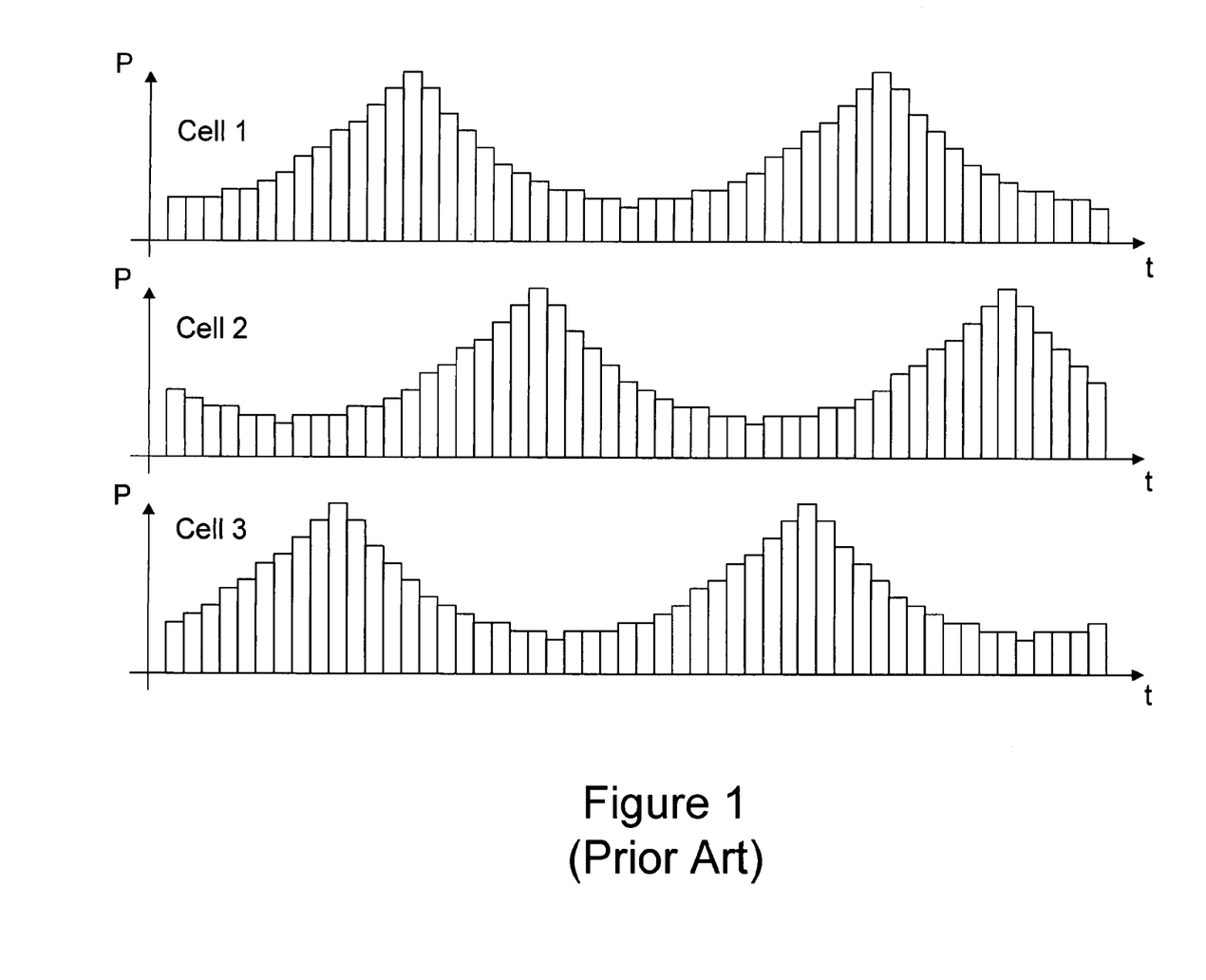
FIG. 1 shows a time-slotted transmission power scheme according to the prior art.

The principle of a time-slotted transmission power scheme according to the prior art solution cited above is illustrated in FIG. 1. The figure shows the power restrictions of the base station for a situation of three neighboring cells, with P denoting the transmission power of the base station of the respective cell and t denoting the time. In a normal situation, the single timeslots are allocated to different terminals at different geographical locations.

This prior art method results in a kind of "breathing" in the cell coverage areas, which would in this case be the desired outcome producing the spatial overlap in the border zone between two cells, enabling camping of a mobile station on either cell.

In U.S. patent application Ser. No. 10/937,296, which is also owned by the present applicant and which was not yet published at the date of filing of the present application, there is proposed a time-based frequency reuse scheme. In the thus proposed solution, there are defined one or more time slots in the time frame structures of neighboring base stations, in which time slots cell management information relating to the respective cell is to be transmitted. Thereby, the defined time slots of neighboring base stations are shifted against each other on a time basis, and thus pilot and broadcast channel transmissions of neighboring base stations can be guaranteed to occur at different times, as can be gathered from FIG. 2.

Figure 2:
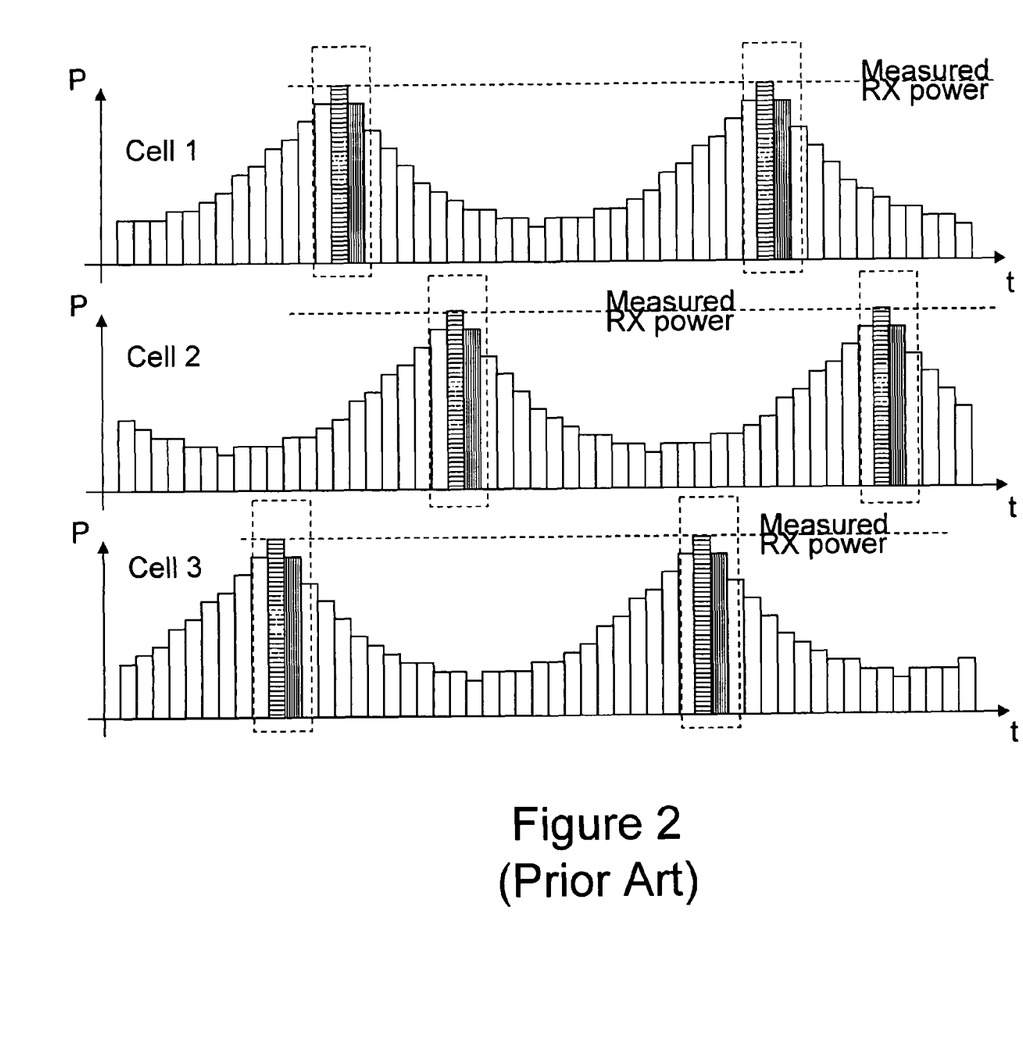
FIG. 2 shows another time-slotted transmission power scheme according to the prior art.

Among others, there are shortcomings of the prior art solutions according to FIGS. 1 and 2 in that the arrangement and properties of time slot transmissions are static after their establishment. Thus, the known solutions do not provide for a flexibility in view of changing conditions, and hence are not sufficiently efficient considering today's demands.

Thus, a solution to the above problems and drawbacks is desirable for a cellular communication network, in which frequency reuse possibilities are limited.

SUMMARY OF THE INVENTION

Consequently, it is an object of the present invention to alleviate the above drawbacks inherent to the prior art and to provide an improved communication resource control enhancing time-based frequency reuse in a mobile communication network.

According to a first aspect of the invention, this object is for example achieved by a method of communication resource control in a cell of a cellular communication network, which cell comprises a base station communicating using at least one frequency and which cell is operated according to a time-based frequency reuse technique, wherein a communication between a terminal and the base station is based on a time frame structure comprising a plurality of time slots, said method comprising the steps of obtaining, at the base station of the cell, loading conditions of at least one cell among the subject cell and its neighboring cells, and adapting, at the base station of the cell, at least one parameter of communication resource control of the base station on the basis of the loading conditions obtained.

According to further advantageous developments at least one of the following applies:

- the step of obtaining loading conditions comprises a step of acquiring loading-related information regarding the terminals in the cell;
- the step of acquiring loading-related information comprises acquiring location information of the terminals in the cell;
- the step of acquiring further comprises a step of generating a location distribution on the basis of the acquired location information;
- the step of acquiring loading-related information comprises acquiring a quality of service required for the terminals in the cell in an uplink direction;
- the step of acquiring loading-related information comprises acquiring pathloss information of the terminals in the cell;
- the step of acquiring further comprises a step of generating a pathloss distribution on the basis of the acquired pathloss information;
- the method further comprises a step of receiving said loading-related information from the terminals in the cell;
- the method further comprises the steps of generating loading conditions of the cell on the basis of the acquired loading-related information regarding the terminals in the cell, and transmitting the generated loading conditions of the cell to at least one base station of the neighboring cells;
- the step of obtaining loading conditions comprises a step of receiving, from at least one base station of the neighboring cells, loading conditions of the at least one neighboring cell;
- the obtaining of loading conditions of a cell is based on a cell status parameter of the cell;
- the cell status parameter comprises an abstracted cell status;
- the step of adapting comprises an adapting of power levels of time slots of the cell;
- the step of adapting comprises an adapting of radiation patterns of the base station of the cell;
- the step of adapting comprises an adapting of modulation/coding combinations of the cell;
- the method further comprises a step of transmitting adapting information from the base station of the cell to the terminals in the cell;
- the step of adapting is performed dynamically; and/or
- the step of adapting comprises an adapting such that at least one of a maximum and a minimum value of said at least one parameter of radio resource control is zero.

According to a second aspect of the invention, this object is for example achieved by a base station, which is operable as a base station of a cell of a cellular communication network, which base station communicates using at least one frequency and which cell is operated according to a time-based frequency reuse technique, wherein a communication between a terminal and the base station is based on a time frame structure comprising a plurality of time slots, said base station comprising obtaining means for obtaining loading conditions of at least one cell among the subject cell and its neighboring cells, and adapting means for adapting at least one parameter of communication resource control of the base station on the basis of the loading conditions obtained.

According to further advantageous developments at least one of the following applies:

- the obtaining means further comprise acquisition means for acquiring loading-related information regarding the terminals in the cell of the base station;
- the acquisition means are further configured for acquiring location information of the terminals in the cell of the base station;
- the acquisition means are further configured for generating a location distribution on the basis of the acquired location information;
- the acquisition means are further configured for acquiring a quality of service required for the terminals in the cell of the base station in an uplink direction;
- the acquisition means are further configured for acquiring pathloss information of the terminals in the cell of the base station;
- the acquisition means are further configured for generating a pathloss distribution on the basis of the acquired pathloss information;
- the base station further comprises transceiver means for receiving said loading-related information from the terminals in the cell of the base station and for supplying said information to the acquisition means;
- the acquisition means are further configured for generating loading conditions of the cell on the basis of the acquired loading-related information regarding the terminals in the cell, and the base station further comprises transceiver means for transmitting the generated loading conditions of the cell to at least one base station of the neighboring cells;
- the base station, further comprises transceiver means for receiving, from at least one base station of the neighboring cells, loading conditions of the at least one neighboring cell and for supplying said information to the obtaining means;
- the obtaining means are configured for obtaining loading conditions based on a cell status parameter of the cell;
- the cell status parameter comprises an abstracted cell status;
- the adapting means are further configured for adapting power levels of time slots of the cell;
- the adapting means are further configured for adapting radiation patterns of the base station of the cell;
- the adapting means are further configured for adapting modulation/coding combinations of the cell;
- the base station further comprises transceiver means for communicating with terminals of the cell of the base station; and/or
- the transceiver means are further configured for receiving adapting information from said adapting means and for transmitting said adapting information to the terminals in the cell of the base station.

According to a third aspect of the invention, this object is for example achieved by a terminal, which is operable as a terminal in a cell of a cellular communication network, which cell comprises a base station communicating using at least one frequency and which cell is operated according to a time-based frequency reuse technique, wherein a communication between the terminal and a base station is based on a time frame structure comprising a plurality of time slots, said terminal comprising operating means for operating the terminal according to an adapting of at least one parameter of communication resource control of the base station, said adapting being performed at the base station of the subject cell on the basis of loading conditions of at least one cell among the subject cell and its neighboring cells.

According to further advantageous developments at least one of the following applies:

the terminal further comprises information providing means for providing loading-related information relating to the terminal to the serving base station;

the information providing means are further configured for providing information on a location of the terminal;

the information providing means are further configured for providing information on a quality of service required for the terminal in an uplink direction;

the information providing means are further configured for providing information on a pathloss of the terminal;

the terminal further comprises transceiver means for transmitting the loading-related information to the serving base station, with said information being supplied by the information providing means;

the terminal further comprises transceiver means for communicating with the serving base station; and/or the transceiver means are further configured for receiving adapting information from the serving base station and for supplying said information to the operating means.

According to a fourth aspect of the invention, this object is for example achieved by a system for communication resource control in at least one cell of a cellular communication network, which cell comprises a base station communicating using at least one frequency and which cell is operated according to a time-based frequency reuse technique, wherein a communication between a terminal and the base station is based on a time frame structure comprising a plurality of time slots, in which system at least one parameter of communication resource control of the base station is adapted on the basis of loading conditions of at least one cell among the subject cell and its neighboring cells, wherein the communication network comprises at least one base station according to the second aspect of the present invention; and at least one terminal according to the third aspect of the present invention.

According to further advantageous developments at least one of the following applies:

the system comprises a non CDMA communication network; and/or the system comprises a CDMA communication network.

According to a fifth aspect of the invention, this object is for example achieved by a computer program product being loadable into a memory of a digital processing means and comprising software code portions for performing the steps of the method according to the first aspect of the present invention when said product is run on said digital processing means.

It is an advantage of the present invention that communication resource control in a time-based frequency reuse environment is adjustable to loading conditions among neighboring cells.

Thereby, it is advantageous that the communication resource control is extended over multiple cells with minimizing the amount of information to be shared between sites.

Thus, it is an advantage of the present invention that capacity and/or throughput of a cellular communication network is enhanced, potentially even on a dynamic basis.

A further advantageous facet resides in that the proposed scheme can be implemented in a distributed manner, and that only information exchange between neighboring base stations is needed.

With the embodiments of the present invention, a scheme for an enhanced time-based frequency reuse for a TDD system as well as for a FDD system is provided.

An example of a communication resource control according to the present invention is a radio resource control.

With the embodiments of the present invention, an enhanced scheme for a time-based frequency reuse based on transmission power of base stations, radiation pattern of a base stations' transmission antennas, or modulation/coding combinations of neighboring cells is provided.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

Previously known prior art mainly focuses on how to obtain coverage and neighbor measurements in a low frequency-reuse network scenario. It does not deal with how to adapt communication and/or radio resource control to different loading situations at different time slots among neighboring base stations, i.e. in neighboring cells.

Hereinafter, radio resource control will be exemplified as a non limiting example for communication resource control. However, although the term radio resources is basically directed to a rather limited frequency band, it is only used for explanatory purposes, and the present invention can be applied to arbitrary frequencies. The term radio resource control in its broad meaning may exemplarily refer to one frequency channel (band), or a time slot, or transmission powers, or code channels (like in CDMA). In this regard, it is to be noted that the basic idea of the present invention can not only be applied to radio/wireless communications but to all kind of (non-wired) communications regardless of the frequencies used, such as infrared frequencies for example.

The present invention is, for example, intended for a cellular communication network where frequency reuse possibilities are limited. Primary target applications are to adapt power levels among neighboring cells to system load changes when using a time-based frequency reuse. Since power levels are only used as an example for a parameter of radio resource control, an adaptation of power levels can also be replaced and/or supplemented by an adaptation of e.g. transmission patterns of base stations and/or modulation/coding combinations. In the situation of a time-based frequency reuse scheme according to the prior art, there are user distribution information and/or required quality of service and/or user pathloss information for performing such an adaptation.

It is assumed throughout the invention that there is a time synchronization between cells, i.e. that the base stations of the mobile communication network are operated in a time-synchronized manner. To achieve high capacity in a continuous-coverage TDD system, synchronization is believed to be necessary. Also in an FDD environment time synchronization is advantageous, since especially handover performance can be improved by cell synchronization.

The present invention is based on the idea of optimally choosing maximum and minimum values of a parameter of radio resource control such as power levels of neighboring cells, if system load changes dynamically. Stated in other words, power levels (or suchlike) in the system are dynamically scaled in order to enable a higher overall system capacity, partly depending on the user positioning in respective cell areas.

In order to control system interference, the maximum and/or minimum power level in light-loaded cells can be decreased, and the maximum and/or minimum power level in high-loaded cells can be increased. Different modulation schemes using changed power levels can then be used to serve users, i.e. terminals, in different cells. The idea of cell synchronization as such also persists, but the cell load and even user locations can advantageously be taken into account in a more accurate way.

In the following, the embodiments of the present invention will be described in more detail.

In advanced radio protocols such as 4G radio protocols, there exists a parameter being denoted by "abstracted cell status". This abstracted cell status is indicative of a relative buffer status and a relative loading of a cell, and it is available in the base station of each respective cell. If the load becomes near (i.e. within some threshold) to full capacity in one cell, and the neighboring cells are all relatively lightly loaded compared to that current cell, the system according to an embodiment of the present invention can decide to adapt power levels of neighboring cells in accordance with the current loading conditions. As one conceivable implementation of the present invention, it can be decided to increase maximum and/or minimum power levels for the cell that is most heavily loaded in the neighborhood and to decrease the maximum and/or minimum power levels for the neighboring cells being less loaded. For example, such a decision may depend (partially) on user location distribution, pathloss distribution and quality of service requirements of terminals in the neighboring cells.

Such a procedure according to an embodiment of the present invention enables the system to adapt to system load changes, and the basic idea of time-based reuse-partitioning stays usable. Thereby, the system can dynamically adapt to changes in the system load, i.e. to possibly changing loading conditions in neighboring cells.

One advantageous aspect of this procedure is that it can be implemented in a distributed way, namely only information exchange between neighboring base stations is needed. Additionally, decreasing of maximum power levels in neighboring cells enables power increase in cells located next to them, if those should need more capacity.

It is possible to track user positions (i.e. positions of terminals) in the cell area, e.g. with pathloss measurements of cell management information such as training sequences and/or by means of directed antennas. According to this information, e.g. depending on the average or distribution of pathloss of terminals and/or required quality of service, possibly compared to the corresponding values in the neighboring cells, it is then decided whether to change minimum or maximum power levels, or both.

For example, if most of the terminals in a cell area are located near the base station or they require a low quality of service, those terminals can probably achieve enough capacity in the time slots with or near minimum transmission power, and the maximum power time slots may not be very usable. This leads to a decision to decrease the maximum power and gives possibility for neighboring cells to increase their minimum power levels. Vice versa, if users are mostly located at the cell edges or require a high quality of service, the minimum power level can be decreased, even set to zero, and consequently, maximum power levels can be increased in one or more neighboring cells. Accordingly, this procedure enables to track feasible interference levels and take into account user locations in cell areas.

The information on a quality of service required for terminals in an uplink direction, i.e. in a communication from the terminal to the base station, is usually available as a service parameter in advanced radio protocols. A geographical user, or terminal, distribution is given e.g. by GPS (Global Positioning System) data or terminal-based data. Pathloss information can be measured by terminals and base stations in cooperation.

It is to be noted that the present embodiment includes the possibility that the maximum power for some slots is adapted to be zero, i.e. there is implemented a partial time-based frequency reuse. In more general terms, such a partial time-based frequency reuse can be understood as a situation where at least one of the maximum and the minimum value of the at least one parameter of radio resource control for one or more time slots is zero. For example, the maximum power of some time slots in one radio frame are zero (cf. in FIG. 4, time slots of cell 2 within dashed box).

With regard to the underlying time-based frequency reuse scheme, it is to be noted that an adaptation of e.g. power levels can either be effected only in time slots which do not transmit cell management information (in order to advantageously avoid a cell breathing effect), or in all time slots including those transmitting cell management information.

Figure 3:
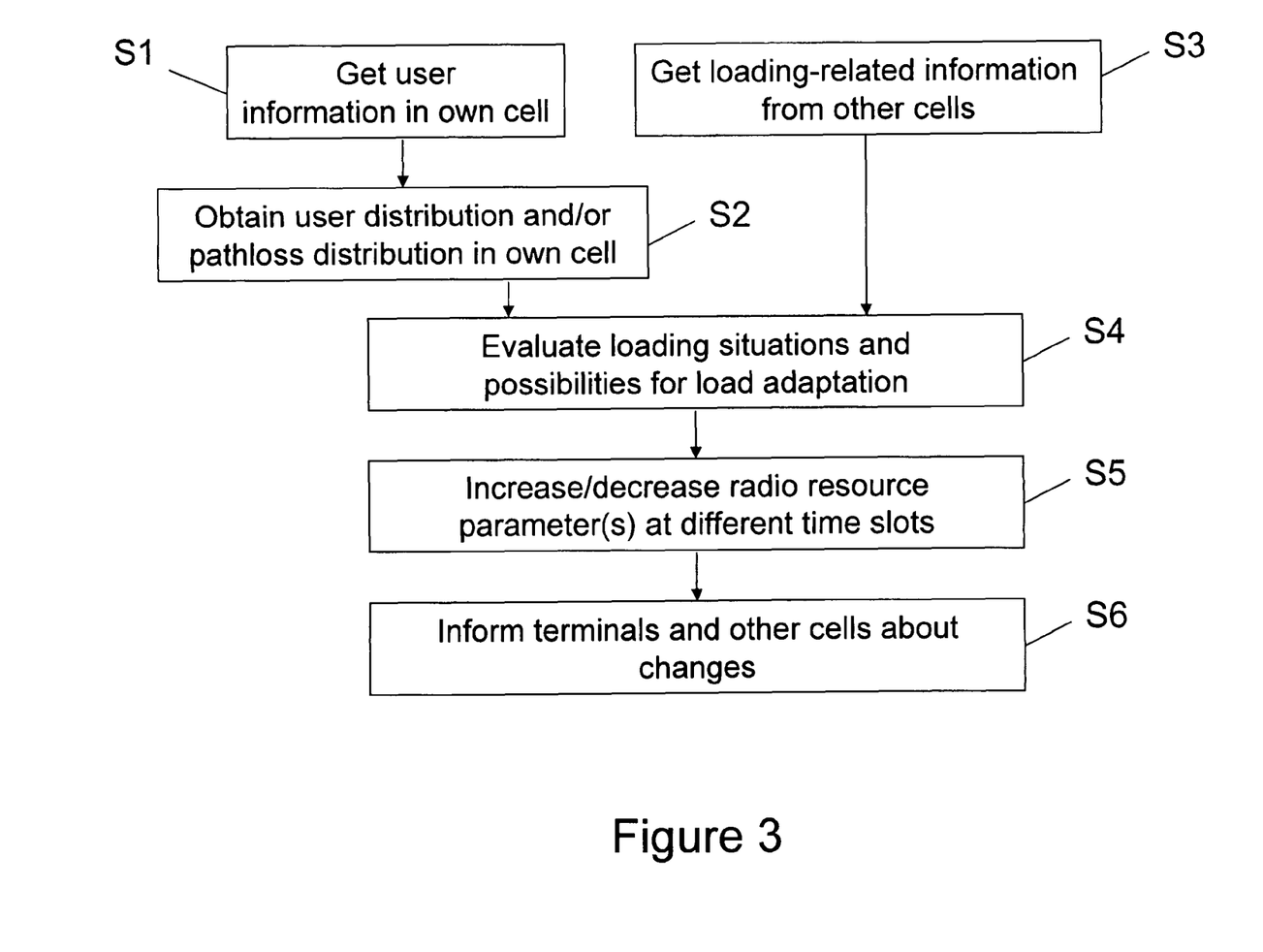
FIG. 3 shows a flow diagram of a generic algorithm flow according to an embodiment of the present invention.

FIG. 3 shows a flow diagram of a generic algorithm flow according to an embodiment of the present invention. The thus depicted flow diagram shows a method according to an embodiment of the present invention in rather generic terms from the point of view of a base station in one cell of a cellular communication network.

In step S1 of FIG. 3, the subject base station gets user pathloss information and/or user location data in its own cell (whereby the latter may for example be attained by means of the Global Positioning System (GPS) or any other system being able to provide position data). In step S2, the base station obtains (generates) user distribution and/or pathloss distribution information in its own cell, which obtaining (generating) is based on the information acquired in step S1.

Besides information in its own cell, the base station also gets information from other cells. For this purpose, in step S3, the base station gets loading-related information from neighboring cells via communications with the base stations of these neighboring cells. Such loading-related information may for example include a cell status parameter of the respective cell (e.g. abstracted cell status), user and/or pathloss distribution, and one or more other radio resource parameters.

In step S4, the base station evaluates the loading situations (including its own loading condition, e.g. its own abstracted cell status) and possibilities to perform load adaptations. This evaluation is mainly based on the information obtained in steps S1 to S3 above. When appropriate, the base station then, i.e. in step S5, performs an adaptation of at least one parameter of radio resource control at one or more time slots. Such an adaptation may for example include an increase/decrease of transmit power, and/or a change of a beam (radiation) pattern of an antenna of the base station, and/or a change of a modulation/coding combination in the subject cell.

As an example, let us suppose that a maximum power level of a time slot t of the cell, say cell A, is increased due to this adaptation. Then, due to the extra power, it might be meaningful to increase the modulation/coding level of that time slot t as well. Correspondingly, an adaptation of the modulation/coding scheme of a cell might be understood to be "on top of" an adaptation of power levels. However, the single adaptations may also be performed independent from each other.

In step S6, the terminals in the cell of the subject base station will be informed about the change of radio resource parameter(s), and other cells, i.e. base stations of neighboring cells, will be informed about the change of loading-related information. This information will then be utilized by the neighboring base stations for their own radio resource adaptation control (cf. step 3 of FIG. 3).

It is to be noted that the illustration of FIG. 3 does not restrict the present invention to the way of processing shown and/or described. FIG. 3 is merely intended to provide a survey of an example operation of one embodiment of the present invention.

By means of the present invention and its embodiments, load adaptation effects among neighboring cells are thus achieved, and thus capacity and/or throughput in a non-CDMA system are enhanced. While the preferred system underling the present invention is a non-CDMA system, it is intended to have a low reuse factor, wherefore a power control may become necessary for the same reason as in CDMA systems. However, the present invention is not restricted thereto, but other types of systems such as CDMA systems can also be enhanced by applying the present invention.

Figure 4:
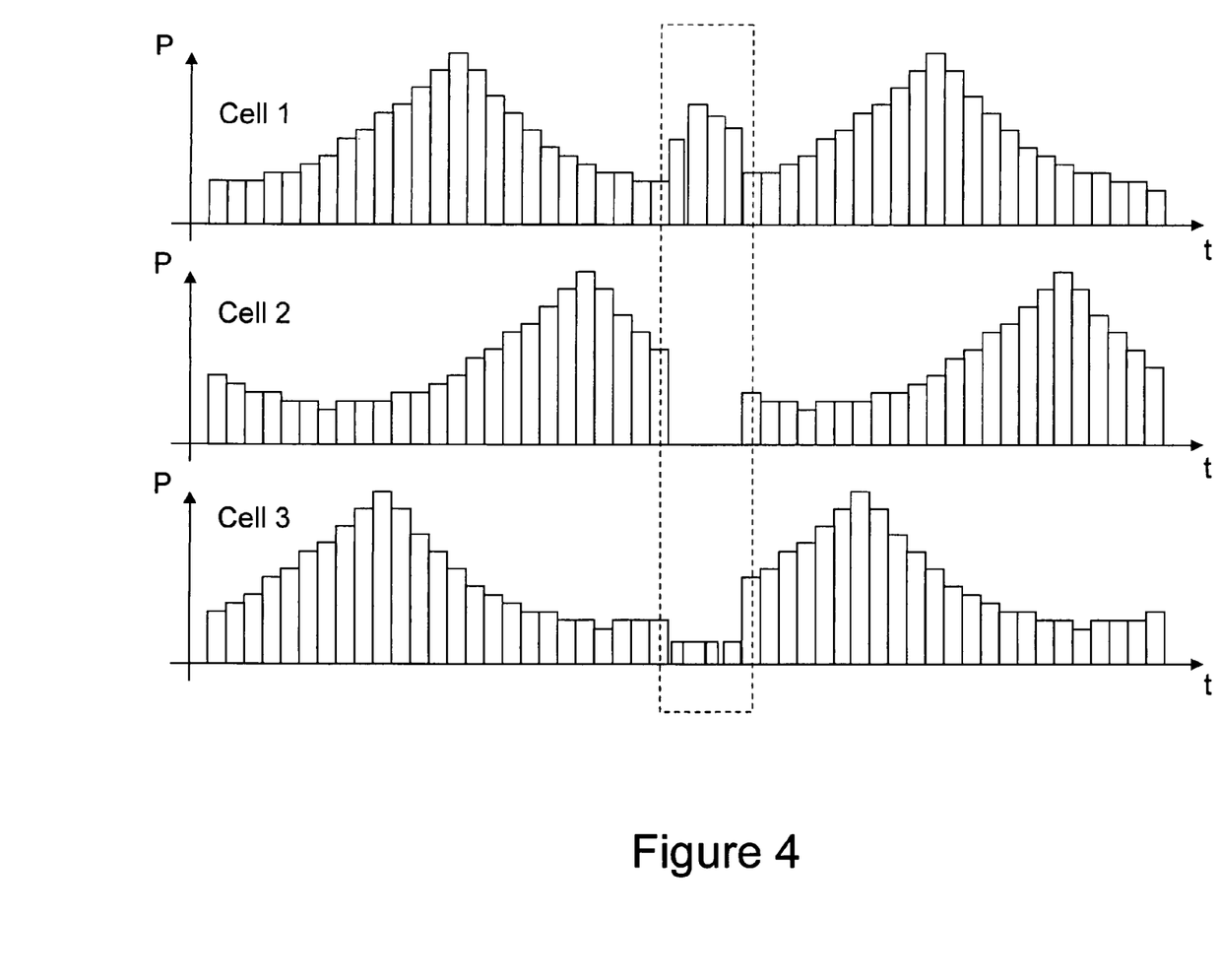
FIG. 4 shows an example of a time-slotted transmission power scheme according to an embodiment of the present invention.

FIG. 4 shows an example of a time-slotted transmission power scheme according to an embodiment of the present invention.

In comparison to the prior art time-slotted transmission power scheme of FIG. 2, a noticeable difference is pointed out by means of a dashed box. It can be gathered from FIG. 4 that, as an example parameter of radio resource control, the transmit power level P of some time slots of cell 1 are increased, while the temporally corresponding time slots of cells 2 and 3 have been decreased in terms of transmit power.

With respect to the respective time slots of cell 2 having zero power, a case of partial time-based frequency reuse as mentioned above is implemented.

In summary, the present invention discloses a method of radio resource control in a cell of a cellular communication network, which cell comprises a base station communicating using at least one frequency and which cell is operated according to a time-based frequency reuse technique, wherein a communication between a terminal and the base station is based on a time frame structure comprising a plurality of time slots, said method comprising the steps of obtaining, at the base station of the cell, loading conditions of at least one cell among the subject cell and its neighboring cells, and adapting, at the base station of the cell, at least one parameter of radio resource control of the base station on the basis of the loading conditions obtained.

Figure 5:
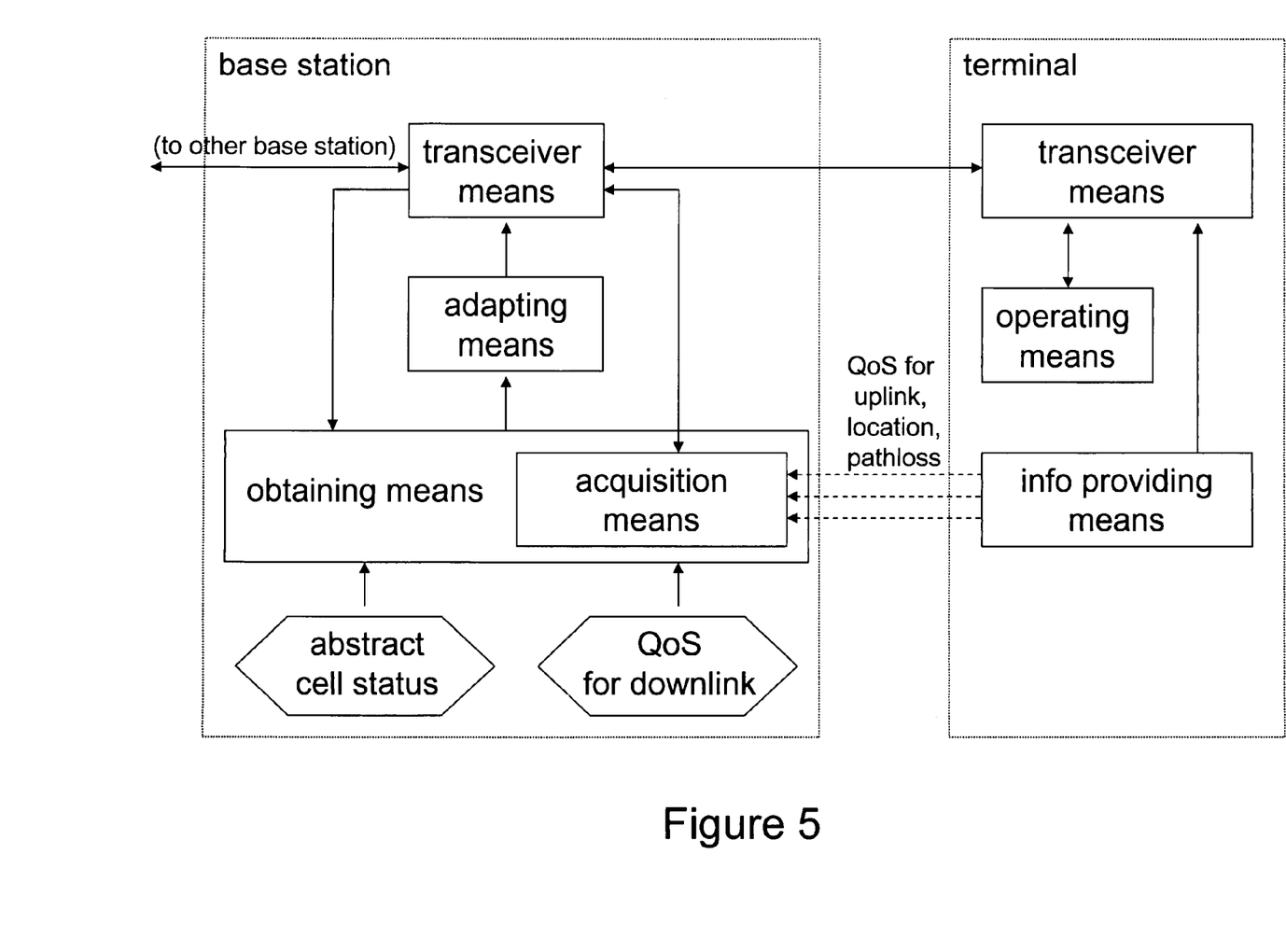
FIG. 5 shows a block diagram of a base station and a terminal according to an embodiment of the present invention.

With reference to FIG. 5, another embodiment of the present invention will be described. FIG. 5 shows a block diagram of a base station and a terminal according to the present embodiment of the invention. Furthermore, it is to be noted that a system according to still another embodiment is constituted by at least one such base station and at least one such terminal (cf. FIG. 6), although for sake of simplicity there is only shown one of each functional elements in FIG. 5.

According to the embodiment of FIG. 5, the base station comprises adapting means, obtaining means, acquisition means, and transceiver means. Further, it is indicated that a cell status parameter of the current cell, which is by way of example denoted "abstracted cell status", is available at the base station. The solid line arrows between the individual blocks denote an exchange of information in the respective direction.

The adapting means are configured for adapting at least one parameter of radio resource control of the cell of the base station in question. In the present invention, such an adaptation is effected among neighboring cells, and is thus based on loading conditions of at least one cell among the subject cell and its neighboring cells. The loading conditions of the current cell are represented by the abstracted cell status which is available at the obtaining means which are configured for obtaining loading conditions of at least one cell among the subject cell and its neighboring cells. Information on the loading conditions in the neighboring cells adjacent to the current cell are received at the obtaining means of the current cell's base station from other base stations via the transceiver means. The obtaining means supply the required loading conditions to the adapting means which are configured for adapting at least one parameter of radio resource control on the basis of the obtained loading conditions.

According to the embodiment shown in FIG. 5, the obtaining of loading conditions also comprises an acquiring of loading-related information regarding terminals in the cell of the subject base station. To this end, the obtaining means further comprise the acquisition means which are configured for acquiring such loading-related information. Relevant loading-related information from terminals in this regard include one or more of the following: required quality of service (QoS) for an uplink direction, location information, and pathloss information. Respective information regarding the terminals in the own cell of said base station (such as the one depicted on the right hand side of FIG. 5) are acquired in cooperation with the terminals in the current cell, which is indicated by broken line arrows between the respective blocks of the base station and the terminal. Accordingly, for receiving said loading-related information from the terminal(s) in the cell and for supplying these information to the acquisition means, the base station comprises further transceiver means or the present transceiver means are further configured for this purpose.

From the information received from the terminals (cf. step 1 of FIG. 3), the base station, or more precisely the acquisition means according to the embodiment shown, is configured for obtaining (generating) location distribution and/or pathloss distribution information in its cell (cf. step 2 of FIG. 3).

In order to enable neighboring base station to operate according to the method of the present invention, the base station according to one embodiment has to be able to provide loading conditions of its cell to its neighboring base station(s). For implementing this, the acquisition means are further configured for generating loading conditions of the cell on the basis of the acquired loading-related information regarding the terminals in the cell. Additionally, the base station further comprises transceiver means for transmitting the generated loading conditions of the cell to at least one base station of the neighboring cells (or the existing transceiver means are configured accordingly). This mode of operation is indicated by the arrow directed from the acquisition means towards the transceiver means which forward these information to other base stations.

The other way round, in order to receive loading conditions from at least one base station of the neighboring cells, the base station comprises transceiver means (or the existing transceiver means are configured accordingly). Thereby, the respective transceiver means also have to be configured to supply the thus received loading conditions to the obtaining means of the current base station, where they are processed for performing an adaptation according to the present invention.

In the embodiment presented in FIG. 5, the transceiver means are further configured for receiving adaptation information from said adapting means and for transmitting said information to the terminals in the cell of said base station. Thereby, both the base station and the terminals in its cell are aware of the at least one adapted parameter of radio resource control (e.g. transmit power levels), and are enabled to operate accordingly (in downlink as well as in uplink direction).

An exemplary terminal according to an embodiment of the present invention is also shown in FIG. 5. Accordingly, besides being configured to be operated according to the method of time-based frequency reuse of the present invention, the terminal comprises operating means. These are configured for operating the terminal according to an adapting of at least one parameter of radio resource control, as described above in connection with the method and the base station according to present embodiments.

According the present embodiment, the terminal also comprises information providing means which are configured for providing loading-related information regarding the terminal to the serving base station. As mentioned above, such information may include required quality of service (QoS), and/or location or location distribution, and/or pathloss or pathloss distribution. Also as mentioned above, the cooperation of the terminal and the serving base station in this regard is indicated by the broken line arrows between the respective blocks of the base station and the terminal.

From a physical point of view, a connection between the two functional elements shown in FIG. 5 is established between transceiver means of the terminal and the transceiver means of the respective base station.

The transceiver means of the terminals according to the present embodiment are thus configured for transmitting the loading-related information regarding the terminal to the base station, with these information being supplied by the information providing means. The transceiver means can also be configured for receiving adapting information (i.e. information on an adaptation of at least one parameter of radio resource control) from the serving base station and for supplying said information to the operating means. Thereby, the operating means are enabled to operate according to the present invention.

This can, for example, be accomplished by a computer program product being loadable into the operating means or a memory thereof, which comprises software code portions for performing the above-mentioned steps of the method according to the present invention when said product is run in the operating means of the terminal. By the way, the same or a similar computer program product can also be loaded into the adapting means of the base station or a memory thereof in order to enable the adapting means of the base station to perform the above-mentioned steps of the method according to the present invention.

At this point, it is to be noted that the connection between the base station and the terminal (indicated by the double-headed arrow between the respective transceiver means) is both for exchanging payload/user information as well as for exchanging signaling and protocol information such as the information with respect to the adaptation according to the present invention.

Figure 6:
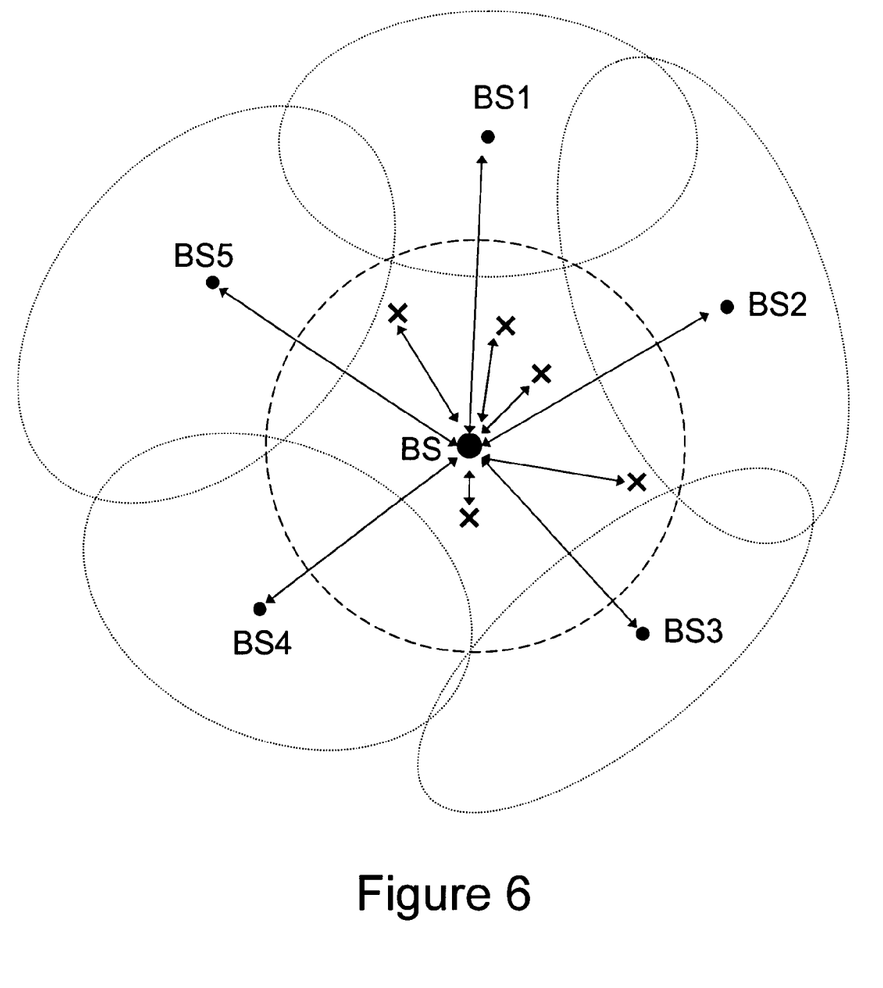
FIG. 6 shows a schematic overview of a system configuration according to an embodiment of the present invention.

FIG. 6 shows a schematic overview of a system configuration according to an embodiment of the present invention. This configuration is only intended as one example configuration of a system for radio resource control, comprising six base stations and five terminals in the subject cell.

In FIG. 6, the currently considered or subject cell is illustrated by a dashed circle arranged in the center of the figure. The subject base station is denoted by reference sign BS. Terminals located in the subject cell are illustrated by means of crosses within the dashed circle illustrating the subject cell. The neighboring cells are illustrated by dotted ellipsoids surrounding the subject cell, and their respective base stations are denoted by reference signs BS1 to BS5.

The single base stations and terminals illustrated in FIG. 6 may e.g. functionally and structurally correspond to the base station and the terminal according to the present invention, such as those shown in FIG. 5.

It can be gathered from FIG. 6 that the subject base station has bidirectional communication links to the base stations of the neighboring cells as well as to the terminals in its own cell. By means of these links to other base stations and terminals, which are in accordance with the respective links indicated in FIG. 5 by double-headed arrows, the method of the present invention is carried out, i.e. a load adaptation between neighboring cells is effected by adapting at least one parameter of radio resource control in the subject cell.

It is to be noted that the bidirectional links shown in FIG. 6, although illustrated to be arranged in a direct manner between respective elements, can also pass over some other elements in-between. For the present invention, it is not essential whether the links, e.g. between base stations, are established on a direct path or via any other known network elements such like base station controllers or mobile switching centers.

In general, it is to be noted that the mentioned functional elements, i.e. the base station and the terminal according to the present invention, and their constituents can be implemented by any known means, either in hardware and/or software, respectively, if it is only adapted to perform the described functions of the respective parts. For example, the adapting means of the base station can be implemented by any data processing unit, e.g. a microprocessor, being configured to adapt a radio resource control among neighboring cells based on loading conditions in at least one of the neighboring cells according to the method of the present invention.

The mentioned parts can also be realized in individual functional blocks or by individual means, or one or more of the mentioned parts can be realized in a single functional block or by a single means. Correspondingly, the above illustrations of FIGS. 5 and 6 are only for illustrative purposes and does not restrict an implementation of the present invention anyhow.

There is disclosed a method of communication resource control in at least one cell of a cellular communication network, which cell comprises a base station communicating using at least one frequency and which cell is operated according to a time-based frequency reuse technique, wherein a communication between a terminal and the base station is based on a time frame structure comprising a plurality of time slots, said method comprising the steps of obtaining, at the base station of the cell, loading conditions of at least one cell among the subject cell and its neighboring cells, and adapting, at the base station of the cell, at least one parameter of communication resource control of the base station on the basis of the loading conditions obtained; and a base station, a terminal, a system, and a computer program product for implementing the method.

The present invention extends prior art solutions, among others, by achieving load adaptation/balancing effects among neighboring cells by use of known parameters and then enhance capacity and/or throughput in a non-CDMA system. Nevertheless, other types of systems can also be enhanced by applying this embodiment of the present invention.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed is:

1. A method, comprising:
   obtaining, at a base station of a cell of a cellular communication network, loading conditions of the cell and loading conditions of at least one neighboring cell;
   adapting, at the base station of the cell, at least one parameter of communication resource control of the base station based on the loading conditions obtained; and
   transmitting, from the base station of the cell to terminals in the cell, adapting information including the at least one adapted parameter of communication resource control and, from the base station of the cell to at least one base station of the at least one neighboring cell, loading conditions of the cell being changed based on the at least one adapted parameter of communication resource control,
   wherein the obtaining, the adapting, and the transmitting are performed independent of a centralized network element.

2. The method according to claim 1, wherein the obtaining loading conditions comprises acquiring loading-related information regarding terminals in the cell.

3. The method according to claim 2, wherein the acquiring loading-related information comprises acquiring location information of the terminals in the cell.

4. The method according to claim 3, wherein the acquiring location information further comprises generating a location distribution based on the location information.

5. The method according to claim 2, wherein the acquiring loading-related information comprises acquiring a quality of service required for the terminals in the cell in an uplink direction.

6. The method according to claim 2, wherein the acquiring loading-related information comprises acquiring pathloss information of the terminals in the cell.

7. The method according to claim 6, wherein the acquiring pathloss information further comprises generating a pathloss distribution based on the pathloss information.

8. The method according to claim 2, further comprising:
   receiving said loading-related information from the terminals in the cell.

9. The method according to claim 2, further comprising:
   generating the loading conditions of the cell based on the loading-related information regarding the terminals in the cell; and
   transmitting the loading conditions of the cell to at least one base station of the at least one neighboring cell.

10. The method according to claim 1, wherein the obtaining loading conditions comprises receiving, from at least one base station of the at least one neighboring cell, the loading conditions of the at least one neighboring cell.

11. The method according to claim 1, wherein the obtaining of loading conditions of the cell is based on a cell status parameter of the cell.

12. The method according to claim 11, wherein the cell status parameter comprises an abstracted cell status.

13. The method according to claim 1, wherein the adapting comprises adapting power levels of time slots of the cell.

14. The method according to claim 1, wherein the adapting comprises adapting radiation patterns of the base station of the cell.

15. The method according to claim 1, wherein the adapting comprises adapting modulation/coding combinations of the cell.

16. The method according to claim 1, wherein the adapting comprises performing the adapting dynamically.

17. The method according to claim 1, wherein the adapting comprises adapting at least one of a maximum and a minimum value of said at least one parameter of radio resource control to be zero.

18. The method according to claim 1, wherein the communication resource control comprises a radio resource control.

19. The method of claim 1, said loading conditions of the cell being transmitted from the base station of the cell to at least one base station of the at least one neighboring cell for being used in communication resource control adaptation of the at least one neighboring cell.

20. An apparatus, comprising:
   at least one memory including computer program code; and
   at least one processor,
   wherein the at least one memory and the computer program code are configured to, with the at least one processor, cause the apparatus at least to
   obtain loading conditions of at least one cell of a cellular communication network and loading conditions of at least one neighboring cell;
   adapt at least one parameter of communication resource control of the apparatus based on the loading conditions obtained; and
   transmit adapting information including the at least one adapted parameter of communication resource control to terminals in the cell; and
   transmit loading conditions of the cell being changed based on the at least one adapted parameter of communication resource control to at least one base station of the at least one one neighboring cell,
   wherein the at least one memory and the computer program code are configured to, with the at least one processor, cause the apparatus at least to obtain the loading conditions, adapt the at least one parameter, transmit the adapting information, and transmit the loading conditions independent of a centralized network element.

21. The apparatus according to claim 20, wherein the at least one memory and the computer program code are also configured to, with the at least one processor, cause the apparatus at least to acquire loading-related information regarding terminals in the cell of the apparatus.

22. The apparatus according to claim 21, wherein the at least one memory and the computer program code are also configured to, with the at least one processor, cause the apparatus at least to acquire location information of the terminals in the cell of the apparatus.

23. The apparatus according to claim 22, wherein the at least one memory and the computer program code are also configured to, with the at least one processor, cause the apparatus at least to generate a location distribution based on the location information.

24. The apparatus according to claim 21, wherein the at least one memory and the computer program code are also configured to, with the at least one processor, cause the apparatus at least to acquire a quality of service required for the terminals in the cell of the apparatus in an uplink direction.

25. The apparatus according to claim 21, wherein the at least one memory and the computer program code are also configured to, with the at least one processor, cause the apparatus at least to acquire pathloss information of the terminals in the cell of the apparatus.

26. The apparatus according to claim 25, wherein the at least one memory and the computer program code are also configured to, with the at least one processor, cause the apparatus at least to generate a pathloss distribution based on the pathloss information.

27. The apparatus according to claim 21, wherein the at least one memory and the computer program code are also configured to, with the at least one processor, cause the apparatus at least to receive said loading-related information from the terminals in the cell of the apparatus and to supply said loading-related information to other operations of the apparatus.

28. The apparatus according to claim 21, wherein the at least one memory and the computer program code are also configured to, with the at least one processor, cause the apparatus at least to generate the loading conditions of the cell based on the loading-related information regarding the terminals in the cell, and to transmit the loading conditions of the cell to at least one base station of the at least one neighboring cell.

29. The apparatus according to claim 20, wherein the at least one memory and the computer program code are also configured to, with the at least one processor, cause the apparatus at least to receive, from at least one base station of the at least one neighboring cell, the loading conditions of the at least one neighboring cell and to supply information to other operations of the apparatus.

30. The apparatus according to claim 20, wherein the at least one memory and the computer program code are also configured to, with the at least one processor, cause the apparatus at least to the loading conditions based on a cell status parameter of the cell.

31. The apparatus according to claim 30, wherein the cell status parameter comprises an abstracted cell status.

32. The apparatus according to claim 20, wherein the at least one memory and the computer program code are also configured to, with the at least one processor, cause the apparatus at least to adapt power levels of time slots of the cell.

33. The apparatus according to claim 20, wherein the at least one memory and the computer program code are also configured to, with the at least one processor, cause the apparatus at least to adapt radiation patterns of the apparatus of the cell.

34. The apparatus according to claim 20, wherein the at least one memory and the computer program code are also configured to, with the at least one processor, cause the apparatus at least to adapt modulation/coding combinations of the cell.

35. The apparatus according to claim 20, wherein the at least one memory and the computer program code are also configured to, with the at least one processor, cause the apparatus at least to receive adapting information from other operations of the apparatus and transmit said adapting information to terminals in the cell of the apparatus.

36. The apparatus according to claim 20, wherein the communication resource control comprises a radio resource control.

37. The apparatus of claim 20, said loading conditions of the cell being transmitted to at least one base station of the at least one neighboring cell for being used in communication resource control adaptation of the at least one neighboring cell.

38. A computer readable medium comprising a computer program, the computer readable medium storing code comprising computer executable instructions configured to control a digital processor, the computer program comprising:
    obtaining, at a base station of a cell, loading conditions of at least one of the cell and loading conditions of at least one neighboring cells;
    adapting, at the base station of the cell, at least one parameter of communication resource control of the base station based on the loading conditions obtained and
    transmitting, from the base station of the cell to terminals in the cell, adapting information including the at least one adapted parameter of communication resource control and, from the base station of the cell to at least one base station of the at least one neighboring cell, loading conditions of the cell being changed based on the at least one adapted parameter of communication resource control,
    wherein the obtaining, the adapting, and the transmitting are performed independent of a centralized network element.

39. The computer readable medium of claim 38, said loading conditions of the cell being transmitted from the base station of the cell to at least one base station of the at least one neighboring cell for being used in communication resource control adaptation of the at least one neighboring cell.

40. An apparatus, comprising:
    obtaining means for obtaining loading conditions of at least one cell of a cellular communication network and loading conditions of at least one neighboring cell;
    adapting means for adapting at least one parameter of communication resource control of the apparatus based on the loading conditions obtained; and
    transmitting means for transmitting, from the base station of the cell to terminals in the cell, adapting information including the at least one adapted parameter of communication resource control and, from the base station of the cell to at least one base station of the at least one neighboring cell, loading conditions of the cell being changed based on the at least one adapted parameter of communication resource control,
    wherein the obtaining, the adapting, and the transmitting are performed independent of a centralized network element.

41. The apparatus of claim 40, said loading conditions of the cell being transmitted from the base station of the cell to at least one base station of the at least one neighboring cell for being used in communication resource control adaptation of the at least one neighboring cell.

* * * * *